United States Patent [19] [11] 3,881,303
Krafka et al. [45] May 6, 1975

[54] ELASTOMERIC HINGE FOR A SWINGABLE AGRICULTURAL MACHINE ELEMENT

[75] Inventors: Jerry Lee Krafka; Bobby Gene Sawyer; Ralph August Gerhardt, all of Ottumwa, Iowa

[73] Assignee: Deere & Company, Moline, Ill.

[22] Filed: July 12, 1973

[21] Appl. No.: 378,729

[52] U.S. Cl. .......... 56/192; 16/150; 56/1
[51] Int. Cl. .......... A01d 43/00
[58] Field of Search ...... 56/192, DIG. 1, 14.9, 15.3, 56/1; 16/150

[56] References Cited

UNITED STATES PATENTS

| | | | |
|---|---|---|---|
| 2,774,246 | 12/1956 | Happe et al. | 56/DIG. 1 |
| 3,676,896 | 7/1972 | Maleck | 16/150 |
| 3,683,602 | 8/1972 | Scarnato | 56/192 X |

FOREIGN PATENTS OR APPLICATIONS

| | | | |
|---|---|---|---|
| 1,115,182 | 5/1968 | United Kingdom | 16/150 |

*Primary Examiner*—Louis G. Mancene
*Assistant Examiner*—J. N. Eskovitz

[57] ABSTRACT

A mower-conditioner has an elongated stationary member and an elongated shield or cover swingably mounted on the stationary member by means of an elongated, normally flat, flexible element, made of reinforced elastomeric material, such as a section of tire carcass or rubber belting, which extends the length of the swingable member and functions as a hinge that biases the swingable member toward a position wherein the flexible element is flat, the flexible element bending to permit the swinging movement of the cover or shield. The swingable member is provided with an elongated slot extending along the edge of the swingable member adjacent the stationary member, one longitudinal edge of the flexible element being disposed in the slot, which is crimped to a lesser thickness than the flexible element to attach the flexible element to the swingable member.

10 Claims, 4 Drawing Figures

84 64 80 76 78 74 82 66 72 70 68

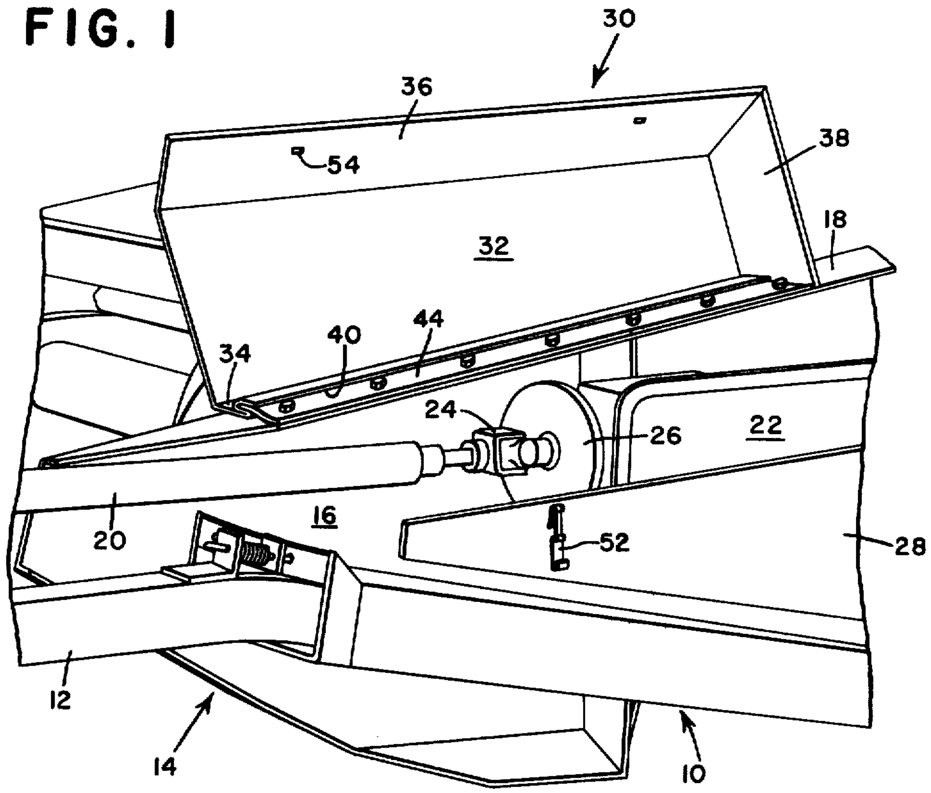
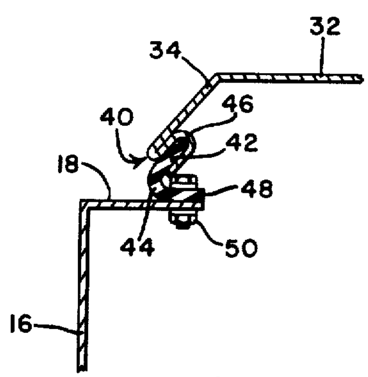
FIG. 2

FIG. 3
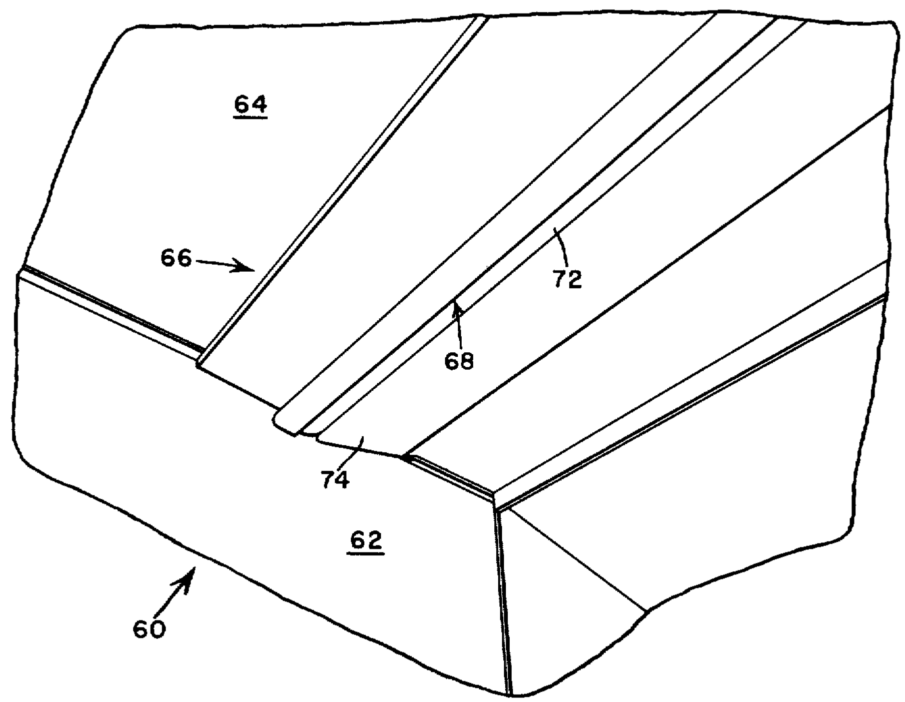
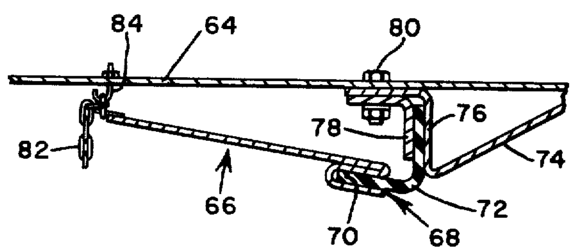
FIG. 4

ELASTOMERIC HINGE FOR A SWINGABLE AGRICULTURAL MACHINE ELEMENT

BACKGROUND OF THE INVENTION

Modern agricultural machines, particularly harvesting machines, utilize a relatively large number of swingable covers or shields, primarily to shield moving components for appearance and safety purposes. The shields are conventionally mounted on elongated hinges to permit swinging of the shield for access to the moving component, the hinges being of the elongated or continuous type, known as piano hinges.

It is known to utilize elongated flexible members, generally made of rubber or the like, to provide a continuous hinge for doors or the like, such hinges permitting swinging of the door while maintaining a seal between the door and the fixed member.

SUMMARY OF THE INVENTION

According to the present invention, there is provided an improved hinge for mounting a shield or a cover on an agricultural machine. More specifically, the improved hinge is made of an elongated, normally flat, flexible element made of reinforced elastomeric material, such as a section of tire carcass or rubber belting.

Also according to the invention, the improved flexible hinge provides a biasing force on the shield or cover to bias it toward a particular position. More specifically, a cover is provided for an agricultural machine drive line, wherein the improved hinge biases the cover toward an open position, the cover being latched down against the bias of the hinge in its closed position.

Another feature of the invention is the utilization of the improved hinge in a deflector shield that is biased toward a vertical crop-deflecting position by the improved hinge and maintained in alternate positions by a latching means against the bias of the hinge.

Still another feature of the invention resides in the method of attaching the hinge to the swingable member. More specifically, the edge of the sheet metal shield is formed to provide a longitudinal slot along the edge of the shield, one end of the flat flexible hinge being inserted in the slot, which is crimped together to tightly engage the edge of the hinge.

An important aspect of the invention resides in the fact that the improved hinge is very inexpensive to manufacture, and utilizes an inexpensive and readily available material.

BRIEF DESCRIPTION OF THE DRAWINGS

FIG. 1 is a left front perspective of a portion of a mower-conditioner including a swingable shield over a portion of the drive line, the shield being mounted on the machine by means of the improved flexible hinge.

FIG. 2 is a vertical section through the hinge shown in FIG. 1.

FIG. 3 is a perspective view of a portion of the windrowforming shields at the rear end of the mower-conditioner shown in FIG. 1, and including a swingable crop-deflecting shield mounted by means of the improved flexible hinge.

FIG. 4 is a vertical section through the crop-deflecting shield shown in FIG. 3.

DESCRIPTION OF THE PREFERRED EMBODIMENT

The invention is embodied in a mower-conditioner having a mobile main frame, indicated generally by the numeral 10, only a portion of which is shown in FIG. 1, the mower-conditioner being shown and described in greater detail in U.S. application, Ser. No. 266,210, filed June 26, 1972. As is well known, the main frame includes a fore-and-aft tongue 12, the forward end of which is connectible to a tractor, and a forward, transversely extending header 14 suspended from the main frame and adapted to remove the crop from the field as the machine advances. The header includes a pair of upright fore-and-aft side panels 16, only the left side panel shown in FIG. 1. The side panel 16 includes an elongated, horizontal, fore-and-aft extending top member 18.

As is well known, a fore-and-aft drive shaft 20 extends rearwardly over the tongue 12 and has its forward end connected to the tractor PTO and its rearward end connected to a gear case 22 through a universal joint 24 and a slip clutch 26. The gear case 22 is mounted on the header 14 and includes three output shafts for driving the conditioner rolls and the cutter bar that are carried by the header.

An upright fore-and-aft extending side panel 28 is mounted along the exterior side of the gear case 22 and the rearward portion of the drive shaft 20 to partially shield the drive line, the side panel 28 being connected to the header by means of mounting brackets (not shown). A swingable top shield or cover 30 overlies the gear case 22 and the rear portion of the drive shaft 20 when the cover is swung to its closed position, wherein the cover seats against the top edge of the side panel, thereby substantially shielding the drive line. The cover 30 is swingable to an open position, as shown in FIG. 1, wherein it permits access to the drive line components. The cover includes a normally horizontal top wall 32 and downwardly and outwardly inclined right and left sidewalls 34 and 36, respectively, the lower edge of the left sidewall seating against the top edge of the side panel 28 when the cover is closed. A generally upright rear wall 38 extends between the rearward ends of the opposite sidewalls to close the cover from the rear, the forward end of the cover being open to accommodate the drive shaft 20.

The right sidewall 34 has an elongated, fore-and-aft bottom edge 40 adjacent the top member 18 of the side panel 16, and the bottom edge 40 is provided with an elongated slot 42 that extends along the length of the bottom edge. The slot 42 is formed by bending the lower portions of the sheet metal right sidewall 34, so that the slot or groove 42 has an inverted, U-shaped cross section, as best seen in FIG. 2. An elongated, normally flat, fore-and-aft extending flexible element 44, made of reinforced rubber, is horizontally disposed on top of the top member 18 and has one edge 46 inserted in and seating against the bottom of the slot 42, while its opposite edge 48 is disposed on top of the top member 18 adjacent the left hand or outer edge of the top member, the terms right and left being with reference to a person facing in the direction of travel of the machine. The flexible element 44 is advantageously made of one or more sections of used tire carcass or rubber belting, both of which are readily available at a very economical price. Such material is also conventionally reinforced so that the flexible element has a relatively high strength. The flexible element 44 is attached to the cover right sidewall 34 by inserting the edge 46 into the slot 42 and then squeezing or crimping the bottom edge 40 of the wall to tightly clamp the flexible element within the slot. The opposite or fixed edge 48 of the flexible element can be similarly attached to the top member 18, although in the illustrated embodiment a plurality of nut-and-bolt-type fasteners 50 are used to removably secure the flexible element 44 to the top member 18.

As is apparent, the flexible element 44 swingably mounts the cover 30 on the header side panels 16, and the flexible element is in its flat or unflexed condition when the cover is in its open position, as shown in FIG. 1. When the cover is swung to its closed position, as shown in FIG. 2, the flexible element 44 bends about a longitudinal fore-and-aft axis, the deformation of the resilient flexible element 44 exerting a biasing force tending to open the cover. A pair of latches 52 are provided on the side shield 28 and are engageable with holes 54 on the cover to releasably hold the cover in its closed position.

A second application for the improved hinge on a mowerconditioner is illustrated in FIGS. 3 and 4. As is well known, and as is described in said U.S. Pat. application, Ser. No. 266,210, the mower-conditioner includes a rear hood structure, indicated in its entirety by the numeral 60, only a portion of the rear hood structure being shown in perspective in FIG. 3. As is known, the crop is discharged upwardly and rearwardly from the conditioner rolls and formed into a windrow by the rear hood structure 60. The structure includes a pair of rearwardly converging generally upright sidewalls 62, only the left sidewall being illustrated in FIG. 3, and a generally horizontal top wall 64. An elongated, transversely extending deflector shield 66 is mounted on the underside of the top wall 64 and is swingable from a vertical position, to a horizontal folded back position as shown in the drawings. In the vertical position, the deflector shield depends from the top wall and is engaged by the rearwardly moving crop, which is deflected thereby into a relatively wide swath or windrow substantially spanning the cutting width of the machine. In the illustrated horizontal position, the shield does not deflect the crop, so that the crop flows rearwardly along the top wall and is converged by the converging sidewalls 62 into a windrow. The deflector shield can be disposed in intermediate positions wherein it deflects the crop in lesser amounts than in the vertical position, to provide intermediate width windrowers. The deflector shield has a front edge 68 similar to the bottom edge 40 of the previously described cover 30, the front edge 68 being provided with an elongated groove or slot 70 along the entire length of the shield. A flexible element 72, similar to the flexible element 44, is mounted in the groove or slot 70 and clamped therein as previously described, and the upper or opposite edge of the flexible element is disposed against the rearward side of a transverse angle member 74 attached to and depending from the lower side of the top wall 64. The angle member 74 has a vertical portion 76 spanning the width of the hood structure 60 and the forward, flat side of the flexible element 72 abuts the rearward side of the vertical wall 76. A clamping element 78 in the form of an angle iron has a vertical leg opposite the vertical wall 76 engaging the opposite or rearward side of the flexible element 72, the clamp 78 also spanning the width of the hood structure so that the flexible element is clamped between the vertical portion of the clamp 78 and the vertical wall 76. A series of fasteners 80 attach the clamp 78 and the transverse angle member 74 to the underside of the top wall 64.

As is apparent, the flexible element flexes about a longitudinal axis between its opposite longitudinal edges, forming a transverse axis about which the deflector shield 66 swings. In the flat, or normal position of the flexible element, the deflector shield is in its vertical position, and the shield is retained in its alternate positions wherein the flexible element is deformed by a chain 82 having one end attached to the deflector shield and hooked at alternate locations along its length on a hook 84 depending from the top wall 64, the particular link of the chain in which the chain is hooked controlling the angular position of the deflector shield, whereby the operator can easily manually adjust the position of the shield. The flexible element 72 biases the shield toward its vertical position, and opposes the force of the crop engaging the shield. As is apparent, the lower angled surface of the angle member 74 is flush with the arcuate bent portion of the flexible element, so that the flexible element in conjunction with the lower side of the angle member presents a smooth surface along which the crop flows.

What is claimed is:

1. In an agricultural machine having an elongated sttationary member and an elongated swingable member having a longitudinal edge disposed adjacent to the stationary member, the combination therewith of improved hinge means connecting the swingable member to the stationary member for swinging about said edge and comprising: at least one elongated, normally flat, flexible element primarily made of elastomeric material; means connecting the flexible element to the stationary member substantially along the length of the element adjacent one longitudinal edge with the portion of one side of the element adjacent said edge flat against the stationary element; an elongated slot extending longitudinally along the longitudinal edge of the swingable member, the other longitudinal edge of the flexible element being tightly received in the slot to clamp the swingable member to the resilient element, whereby the flexible element bends about a longitudinal axis between its opposite edges to permit the swingable member to swing relative to the stationary member about said axis.

2. The invention defined in claim 1 wherein the flexible element is made of tire carcass.

3. The invention defined in claim 1 wherein the flexible element is made of rubber belting.

4. The invention defined in claim 1 wherein the swingable member comprises a cover that is open when the flexible element is in its flat, normal condition, and having latch means for retaining the cover in a closed condition against the bias of the deformed flexible member.

5. The invention defined in claim 1 wherein the swingable member comprises an elongated deflector shield generally vertically depending from the fixed member when the flexible element is in its normal, flat condition and swingable to alternate positions when the flexible element is flexed, and means for retaining the swingable member in its alternate positions against the bias of the deformed flexible element.

6. The invention defined in claim 5 wherein the deflector shield is located in the crop discharge trajectory in a harvesting machine, the crop successively engaging the fixed member, the flexible element and deflector shield when the shield is in its vertical position.

7. In a harvesting machine having a frame and a drive means mounted on the frame, the combination therewith of an improved hinge means for pivotally mounting a cover adjacent the drive means for swinging between an open position wherein its provides access to the drive means and a closed position wherein it shields the drive means, said cover including an elongated edge, said hinge comprising: at least one elongated, normally flat, flexible element, primarily made of elastomeric material and normally having a generally rectangular cross section; means connecting one longitudinal edge of the flexible element to the frame; and means connecting the opposite longitudinal edge of the flexible element to the cover, the flexible element bending between its opposite edges as the cover swings between its alternate positions.

8. The invention defined in claim 7 wherein the means connecting the flexible element to the cover includes an elongated slot extending longitudinally along the edge of the cover, the longitudinal edge of the flexible element being disposed in the slot and the slot being squeezed to clamp the edge of the flexible element in the slot.

9. The invention defined in claim 7 wherein the flexible element is made of reinforced rubber.

10. The invention defined in claim 9 wherein the cover is in its open position when the flexible element is in its flat condition, the flexible element being resiliently deformed when the cover is in its closed position so that the flexible element exerts a biasing force tending to swing the cover to its open condition.

* * * * *